United States Patent [19]

Prevot

[11] Patent Number: 5,018,306
[45] Date of Patent: May 28, 1991

[54] BEARING DEVICE FOR SLIDING LEAF OF DOORS, WINDOWS OR THE LIKE

[75] Inventor: M. Gérard Prevot, Willerwald, France

[73] Assignee: Ferco International, Sarrebourg, France

[21] Appl. No.: 517,720

[22] Filed: May 2, 1990

[30] Foreign Application Priority Data

May 22, 1989 [FR] France ................ 89 06834

[51] Int. Cl.⁵ .......................... E05D 13/02
[52] U.S. Cl. .................................. 49/425
[58] Field of Search ............ 49/425, 426, 427; 16/30, 105, 107; 384/54, 125

[56] References Cited

U.S. PATENT DOCUMENTS

| | | | |
|---|---|---|---|
| 1,825,162 | 9/1931 | Sawyer | 49/425 |
| 1,892,845 | 1/1933 | McGrath | 16/30 |
| 1,900,672 | 3/1933 | Uhl | 16/30 X |
| 2,566,522 | 9/1951 | Hezlep | 16/105 X |
| 2,931,434 | 4/1960 | Steel | 49/425 X |
| 3,208,109 | 9/1965 | Buck | 49/425 |
| 3,442,052 | 5/1969 | Levine | 49/425 |
| 4,262,451 | 4/1981 | Dallaire | 49/425 |
| 4,639,970 | 2/1987 | Adams | 49/425 X |

Primary Examiner—Rodney M. Lindsay
Assistant Examiner—Jerry Redman
Attorney, Agent, or Firm—Sandler, Greenblum & Bernstein

[57] ABSTRACT

A bearing device for sliding leaf of closures, such as doors or windows, having a slide inserted under the lower rail of the sliding leaf and provided with at least a bearing element freely rotatingly mounted onto a horizontal spindle. The slide of this bearing device has recesses capable of receiving elastically distortable elements to guide and support the spindle onto which is mounted the bearing element.

10 Claims, 1 Drawing Sheet

BEARING DEVICE FOR SLIDING LEAF OF DOORS, WINDOWS OR THE LIKE

BACKGROUND OF THE INVENTION

1. Field of the Invention

The invention relates to a bearing device for a sliding leaf or closures, of doors, windows or the like, comprising a slide inserted below the lower rail of the leaf provided with at least one bearing element free and rotatingly mounted onto a horizontal spindle.

This invention will find application more particularly in the field of building and furnishing ironmongery.

2. Description of Relevant Information

A number of bearing devices similar to the description above and making the movement of a sliding leaf, e.g. of a door, window or the like easier, are already known.

These bearing devices are, in all cases, comprised of a slide inserted under the lower rail of a leaf by means of appropriate fixing elements. In this respect, it should be noted that it is a frequent practice to integrate this slide into a slot provided in a profile which is, in turn, inserted under the lower rail of the leaf or, eventually, forming the lower rail.

This slide is furthermore provided with bearing elements, such as casters, freely and rotatingly mounted onto horizontal spindles integrated in the slide. It is a frequent practice to design these bearing elements and, viz., the casters, of a resilient material capable of lessening rolling noises during the sliding of the leaf. However, such resilient materials have the disadvantage of quickly wearing, which obliges the manufacturer to foresee means allowing the user to replace these bearing elements.

Thus, a bearing device is known which comprises a slide made of pressed and folded sheet serving to maintain and guide a bearing element such as a caster. More particularly, this slide is comprised, according to a first embodiment, of two vertical and parallel wings connected, at their lower edge, to a horizontal wall. This wall is provided with an opening into which can partially be engaged the bearing element. Furthermore, the vertical and parallel wings have, at their lower edge, cuts receiving the ends of the spindle onto which is freely and rotatingly mounted the caster forming the bearing element.

In fact, it is only under the action of gravity and because of the weight of the leaf, which rests on the slide or slides of the bearing devices, that the ends of the spindle, corresponding to the bearing elements, are maintained in their respective cut provided in the slide.

This solution is unsatisfactory and, in all cases, unreliable. The sliding leaf of a door, window or the like has indeed, generally, a vertical backlash relative to its sash-frame in order to allow mounting. Therefore, a brute control or a hindrance encountered at the opening or closing of this sliding leaf can generate a lifting effect of the leaf and, finally, the sudden disengagement of the bearing elements out of their slides.

There is also known a design wherein the slide is formed of a pressed and folded sheet so that it comprises, two vertical parallel wings connected, at their upper edge, to a horizontal wall. In the lower edge of these vertical parallel wings are provided hopper-shaped cuts ending through a throttling. The width of this throttling is slightly smaller than the diameter of the spindle on which is mounted a bearing element, into an opening, of elongated shape, capable of receiving the spindle concerned.

The general flexibility of a slide made of a pressed and folded sheet permits the passing of this spindle through the throttling of the aforementioned cut, by a simple pressure or traction exerted the bearing element. Therefore, the bearing element can be withdrawn from its slide only upon intervention by the user.

All things considered, although it provides a solution for the problem of the bearing device designed according to the embodiment set forth above, the bearing device corresponding to the second example has a number of disadvantages related to the design of the slide.

This latter is indeed made of a folded and pressed sheet which has only a low mechanical strength. Therefore, under the action of the weight of the sliding leaf or a wrong handling of same, the vertical parallel wings of the slide tend to become distorted. It will generally be convenient to engage this slide into a profile with a "U"-shaped section inserted under the lower rail of the sliding leaf.

Furthermore, since the sheet forming these slides has necessarily a small thickness, the ends of the spindle onto which is mounted a bearing element are caused to move on small-width journals frequently causing a quick wear of this spindle. In addition, such small and metallic journals generate noise when opening or closing the sliding leaf.

Therefore, in order to reduce the amplitude of these rolling noises during the handling of a sliding leaf, there has been designed a bearing device, the slide of which is comprised of two vertical parallel wings made integral with one another, at their upper edge, by means of a horizontal wall. In the lower edge of these parallel and vertical wings is provided a hopper-shaped cut ending, through a throttling, into an opening with a diameter adjusted to that of the spindle onto which is freely rotatingly mounted the bearing element. Thus, during the mounting, this bearing element is installed between the vertical parallel wings of the slide, while the ends of its spindle are engaged into the aforementioned hopper-shaped cuts. It is then necessary to exert some pressure onto this bearing element in order to force the passage of the ends of the spindle through the throttling, so that they are housed in the openings the size of which is adjusted for this purpose. It should be noted, in addition, that this spindle can also be made, according to this prior document, of a synthetic material.

In fact, although the above-described bearing device solves the problem of noise usually generated by the metallic bearing devices, it makes use of a slide, the mechanical strength of which is only slightly higher than that of a slide made of pressed and folded sheet.

SUMMARY OF THE INVENTION

An object of the present invention is to provide a solution for all the above-mentioned problems by providing a bearing device not only particularly strong, but also, with a noise level during operation reduced to a minimum. Therefore, the invention relates to a bearing device for sliding leaf of doors, windows or the like, comprising a slide inserted under the lower rail of a leaf and provided with at least a bearing element freely and rotatingly mounted on a horizontal spindle. This bearing device can be characterized in that the slide comprises recesses capable of receiving elastically distortable means to guide and support the spindle which is mounted the bearing element.

The main advantages obtained by this invention mainly consist in that a metallic, thus particularly strong slide is capable of receiving bearing elements by simple engagement of the slide, which makes replacement particularly easy and practical. These advantages are in fact mainly due to the supporting and guiding means of the spindle of a bearing element which, because of flexibility, allow an easy mounting and dismantling of same and, in addition, result in a particularly low noise level during operation. The understanding of this description will be made easier with reference to the attached drawing.

BRIEF DESCRIPTION OF THE DRAWINGS

FIG. 1 is a schematic and cross-sectional view of the bearing device, according to the invention, arranged in the slot of a "U"-shaped profile the lower rail of the sliding leaf is fitted with;

FIG. 2 is a cross-sectional view according to II—II of FIG. 1;

FIG. 3 is a schematic and partial view of the bearing device, showing, more particularly, an embodiment of the supporting and guiding means of the spindle of a bearing element.

DETAILED DESCRIPTION OF PREFERRED EMBODIMENTS

This invention relates to a bearing device 1 intended to be inserted under the lower rail 2 of a sliding leaf 3 corresponding to a door, window or the like. In fact, the function of such a bearing device 1 is to make the movement of said sliding leaf 3 easier with less operation noise.

The bearing device may be either fixed directly under lower rail 2 or integrated into a "U"-shaped profile 4 which is frequently used.

This solution is commonly adopted due to aesthetic requirements. It indeed allows to make the bearing devices of a sliding leaf particularly discrete without it being necessary to notch lower rail 2 of the sliding leaf.

Bearing device 1, the object of this invention, is comprised, on the one hand, of a slide 5 fixed on lower rail 2 of the sliding leaf 3 and, on the other hand, of at least a bearing element 6 integrated into slide 5.

Figures 1, 2, 3:
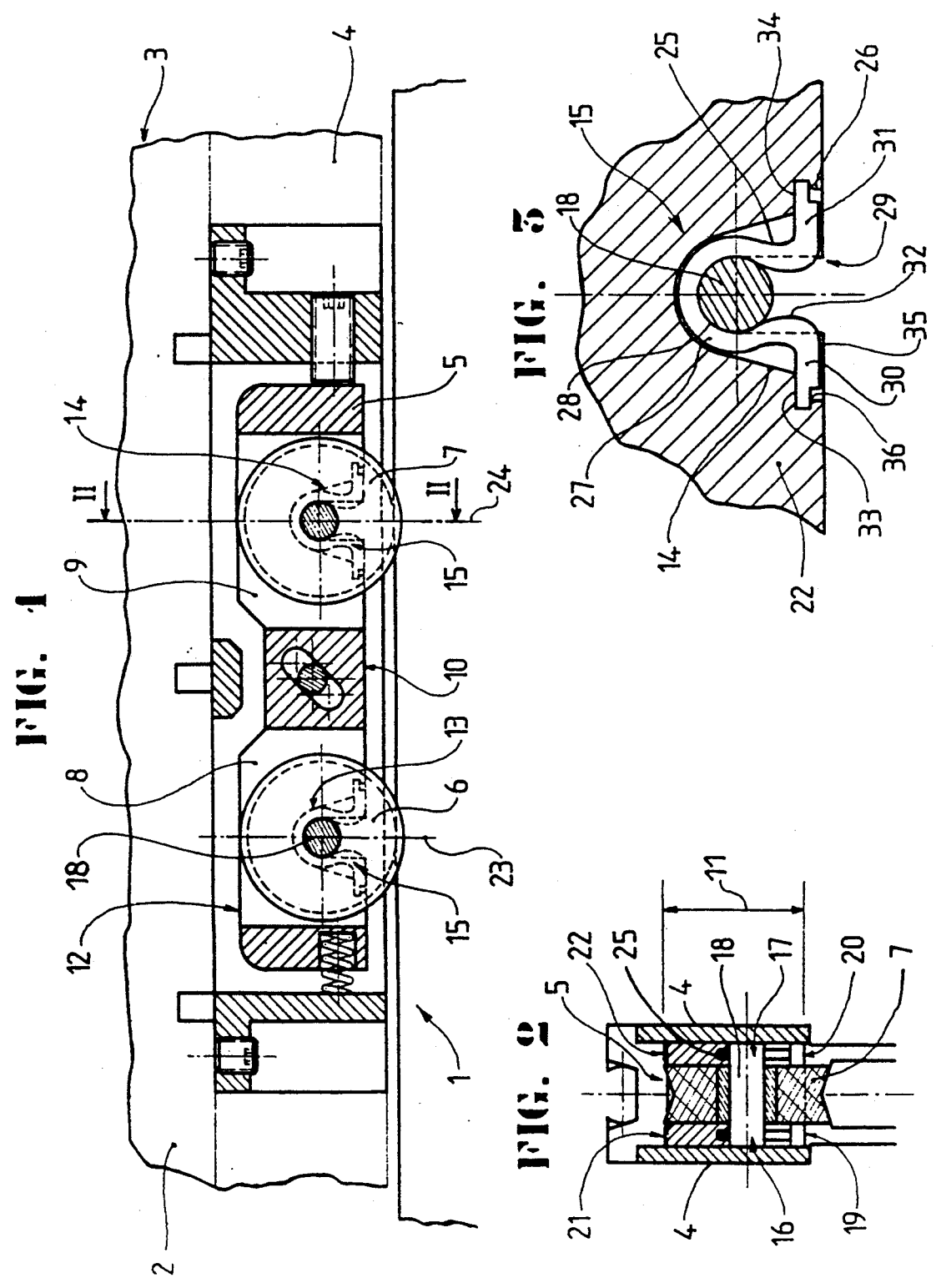

FIG. 1 shows a bearing device provided with two bearing elements 6, 7. It is however, obvious that this invention is in no way limited to such an embodiment and it is possible to fit said bearing device 1 with a single bearing element 6 or even with a much larger number of bearing elements.

The slide 5 has advantageously the shape of a wrought or cast metallic part, which provides good mechanical strength necessary in the case of application of bearing device 1 to particularly heavy sliding leafs, such as for French windows.

This slide 5 furthermore comprises recesses 8, 9 intended to receive bearing elements 6, 7, such as casters, rollers or the like. In fact, these recesses 8, 9 will necessarily end at the lower face 10 of the slide 5, so that bearing elements 6, 7 are capable of partially protruding out of recesses 8, 9 and of co-operating with a slide generally affixed to the lower rail of the sash-frame of the door, window or the like.

In addition, in order to reduce the height 11 of the bearing device 1 to a minimum and, in fact, the overall size of bearing device, these recesses 8, 9 may also end at the upper face 12 of the slide 5. Thus, the bearing elements 6, 7 will be flush with upper face 12 of slide 5.

As specified above, bearing elements 6, 7 are preferably made of a synthetic material, to substantially lessen rolling noise on the slide provided on the lower rail of the sash-frame. Such synthetic materials are however, generally, quickly worn. Therefore, it should be possible to replace, at the right moment, bearing elements 6, 7.

For this purpose and according to a feature of this invention, the slide 5 comprises recesses 13, 14 capable of receiving elastically distortable supporting and guiding means 15 into which can be removably mounted ends 16, 17 of horizontal spindles 18 on which are mounted bearing elements 6, 7.

According to a preferred embodiment of this invention, recesses 13, 14 consist of cuts provided in lower edges 19, 20 of side walls 21, 22 of slide 5, substantially in the transversal median plane 23, 24 of recesses 8, 9 into which are integrated bearing elements 6, 7. These cuts or recesses 13, 14 widen out in the direction of lower edge 19, 20 of the side walls 21, 22 and receive the supporting and guiding means 15.

Guiding means 15 are preferably formed by bearing blocks 25 advantageously made of an elastically distortable material such as synthetic materials, and take the shape of an "omega". This bearing block is also comprised of a gaping cylindrical part 27 defining an opening 28 with a diameter adjusted to that of the spindle 18 onto which is mounted a bearing element 6, 7 and a base 29 comprised of two horizontal feet 30, 31 extending in opposite directions and made integral with the cylindrical part 27. It will be noticed that opening 32 defines a throttling with a cross-section smaller than the diameter of spindle 18 and through which spindle 18 reaches the opening 28. This is made possible due to the flexible material of which bearing blocks 25 are made. In this respect, it should also be observed that the bearing blocks 25, made of synthetic material, allow spindles 18 to be made of identical material.

Preferably and according to another feature of this invention, bearing blocks 25 are held in the recesses 13, 14 by a crimping 26. More particularly, in lower edges 19, 20 of side walls 21, 22 of the slide 5 and in recesses 13, 14 are provided set-backs 33, 34 capable of receiving the free ends of the horizontal feet 30, 31. Horizontal feet 30, 31 also comprise, at lower face 35 and their free end, a set-back 36 into which is pushed the material at the moment of crimping made in lower edges 19, 20 of side walls 21, 22.

Thus, upon mounting and setting the various bearing blocks 25, which form the supporting and guiding means 15, into recesses 13, 14 of slide 5, ends 16, 17 of horizontal spindles 18 corresponding to the bearing elements 6, 7 are engaged into bearing blocks 25. Therefore, it is necessary to exert some pressure onto bearing elements 6, 7, so as to cause the passage of the ends 16, 17 of spindle 18 through the throttling of the bearing blocks 25 and to ensure engagement into the correspondingly adjusted openings 28.

By associating a solid metallic slide with elastically distortable supporting and guiding means into which can be engaged, by simple engagement, the horizontal spindles of the bearing elements, this invention eliminates all the disadvantages encountered within the framework of known bearing devices.

What is claimed is:

1. A bearing device adapted to be mounted at a lower portion of a sliding closure, said bearing device comprising a slide including at least one recess, an elastically distortable element mounted in each respective recess, said element comprising means for guiding and bearing a horizontal spindle for retaining a bearing element freely and rotatingly mounted on said horizontal spindle.

2. A bearing device according to claim 1, wherein said slide is provided with side walls having lower edges provided with cuts thereby defining said at least one recess, wherein said at least one recess is adapted to partially engage said at least one bearing element, said cuts arranged substantially in a transversal median plane of said recess.

3. A bearing device according to claim 2, wherein said cuts are widened in a direction toward said lower edges of said side walls.

4. A bearing device according to claim 2, wherein said at least one recess is adapted to receive a bearing block, said bearing block being made integral with said slide by a crimping.

5. A bearing device according to claim 4, wherein said bearing block is shaped as an "omega" comprising a cylindrical part and a base comprised of two horizontal feet extending in opposite directions made integral with said cylindrical part, said side walls of said slide comprising, at said lower edges of said recesses, set-backs adapted to receive said horizontal feet corresponding to said bearing blocks.

6. A bearing device according to claim 5, wherein said horizontal feet each comprise a free end having a second set-back adapted to receive material of said elastically distortable means pushed from said crimping into said lower edges of said side walls.

7. A bearing device according to claim 1, wherein said elastically distortable element is formed as a bearing block shaped as an "omega", comprising a cylindrical part defining an opening adjustable top a diameter of said spindle and a base comprised of two horizontal feet extending in opposite directions and made integral with said cylindrical part.

8. A bearing device according to claim 7, wherein said cylindrical part further comprises a second opening defining a throttling having a cross-sectional diameter smaller than said diameter of said spindle and through which said spindle is to pass to engage in said opening of said cylindrical part by elastically distorting said bearing block.

9. A bearing device according to claim 7, wherein said bearing block is made of an elastically distortable synthetic material.

10. A bearing device according to claim 1, wherein said spindle is made of a synthetic material.

* * * * *